(12) United States Patent
Abbad et al.

(10) Patent No.: US 11,377,949 B2
(45) Date of Patent: Jul. 5, 2022

(54) MULTIPHASE FLOW METERING

(71) Applicant: SCHLUMBERGER TECHNOLOGY CORPORATION, Sugar Land, TX (US)

(72) Inventors: Mustapha Abbad, Al-Khobar (SA); Dominic Joseph Brady, Al-Khobar (SA); Patrice Ligneul, Elancourt (FR); Stephen Dyer, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 12 days.

(21) Appl. No.: 15/997,353

(22) Filed: Jun. 4, 2018

(65) Prior Publication Data
US 2018/0347338 A1 Dec. 6, 2018

Related U.S. Application Data

(60) Provisional application No. 62/515,150, filed on Jun. 5, 2017.

(51) Int. Cl.
| | |
|---|---|
| *G01N 27/08* | (2006.01) |
| *E21B 47/07* | (2012.01) |
| *G01N 27/22* | (2006.01) |
| *G01F 1/42* | (2006.01) |
| *G01F 1/69* | (2006.01) |

(Continued)

(52) U.S. Cl.
CPC .............. *E21B 47/07* (2020.05); *E21B 34/06* (2013.01); *E21B 47/06* (2013.01); *E21B 47/103* (2020.05); *E21B 49/08* (2013.01); *G01F 1/42* (2013.01); *G01F 1/69* (2013.01); *G01F 1/74* (2013.01); *G01F 15/005* (2013.01); *G01N 27/08* (2013.01); *G01N 27/223* (2013.01); *E21B 41/0085* (2013.01); *E21B 49/0875* (2020.05)

(58) Field of Classification Search
CPC .... E21B 47/065; E21B 47/1005; E21B 34/06; E21B 49/08; E21B 47/06; E21B 2049/085; E21B 41/0085; G01F 1/74; G01F 15/005; G01F 1/69; G01F 1/42; G01N 27/08; G01N 27/223
See application file for complete search history.

(56) References Cited

U.S. PATENT DOCUMENTS

| | | | |
|---|---|---|---|
| 6,681,625 B1 * | 1/2004 | Berkcan | G01F 1/6847 73/204.15 |
| 2004/0226360 A1 * | 11/2004 | Lotters | G01F 7/00 73/204.27 |

(Continued)

OTHER PUBLICATIONS

Carslaw and Jaeger, "Conduction of Heat in Solids", pp. 176-193 and 255-260, 1959.

*Primary Examiner* — Xin Y Zhong
(74) *Attorney, Agent, or Firm* — Trevor G. Grove

(57) ABSTRACT

Multiphase flow metering is provided. In one possible implementation, a multiphase flow measurement system includes at least one reference temperature sensor at a first position configured to measure a first temperature of a multiphase flow. The multiphase flow measurement system also includes at least one heated temperature sensor at a second position downstream of the reference temperature sensor configured to excite the multiphase flow and measure a second temperature of the multiphase flow.

18 Claims, 11 Drawing Sheets

(51) Int. Cl.
  *E21B 47/06* (2012.01)
  *E21B 49/08* (2006.01)
  *E21B 34/06* (2006.01)
  *G01F 15/00* (2006.01)
  *G01F 1/74* (2006.01)
  *E21B 47/103* (2012.01)
  *E21B 41/00* (2006.01)

(56) References Cited

U.S. PATENT DOCUMENTS

| | | | |
|---|---|---|---|
| 2009/0000390 A1* | 1/2009 | Duhanyan | G01F 1/74 |
| | | | 73/861.04 |
| 2011/0040485 A1* | 2/2011 | Ong | E21B 47/10 |
| | | | 702/12 |
| 2015/0308875 A1* | 10/2015 | Muller | G01F 1/692 |
| | | | 73/204.26 |
| 2016/0290849 A1* | 10/2016 | Badarlis | G01F 1/684 |
| 2017/0115148 A1* | 4/2017 | Sasaki | G01F 1/6847 |
| 2017/0356774 A1* | 12/2017 | Gaberthuel | G01F 1/6842 |

* cited by examiner

MULTIPHASE FLOW METERING

CROSS-REFERENCE TO RELATED APPLICATIONS

The present application claims priority from U.S. Provisional Appl. No. 62/515,150, filed on Jun. 5, 2017, entitled "Multiphase Flow Metering," herein incorporated by reference in its entirety.

BACKGROUND

In the last few decades, the oil and gas industry has developed advanced methods and technologies to improve recovery and lower the development costs associated with complex reservoirs. With the progress made in drilling technologies, long horizontal and multilateral wells have become a cost-effective design to increase reservoir contact. However, the increased wellbore length associated with such approaches can often generate a toe-to-heel effect in which water or gas breakthrough at the heel can lead to increased drawdown in the heel region and consequently an early end of the well. The toe-to-heel effect can also complicate the uniform clean-up of a well.

SUMMARY

Multiphase flow metering is provided. In one possible implementation, a multiphase flow measurement system includes at least one reference temperature sensor at a first position configured to measure a first temperature of a multiphase flow. The multiphase flow measurement system also includes at least one heated temperature sensor at a second position downstream of the reference temperature sensor configured to excite the multiphase flow and measure a second temperature of the multiphase flow.

In another possible implementation, a multiphase flow measurement system includes production tubing through which a multiphase flow can be directed, the tubing including an intake end for accepting the multiphase flow and one or more reference temperature sensors at a first position in the tubing downstream of the intake end, the one or more reference temperature sensors for measuring a first temperature of the multiphase flow. The multiphase flow measurement system also includes one or more heated temperature sensors at a second position in the tubing downstream of the first position in the tubing, the one or more heated temperature sensors for heating up the multiphase flow and measuring a second temperature of the multiphase flow.

In yet another possible implementation, a computer-readable tangible medium has instructions stored thereon that, when executed, direct a processor to receive first temperature measurements associated with one or more passive resistance temperature detectors measuring a first temperature of a multiphase flow. The computer-readable tangible medium also has instructions stored thereon that direct the processor to receive second temperature measurements associated with one or more heated resistance temperature detectors measuring a second temperature of the multiphase flow. The computer-readable tangible medium further has instructions stored thereon that direct the processor to receive pressure change information associated with a difference in pressure in the multiphase flow between an intake and a throat of a Venturi nozzle and utilize the first temperature measurements, the second temperature measurements and the pressure change information to calculate one or more phase flow characteristics of the multiphase flow.

This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

In the following description, numerous details are set forth to provide an understanding of some embodiments of the present disclosure. However, it will be understood by those of ordinary skill in the art that the systems and/or methodologies disclosed herein may be practiced without these details and that numerous variations or modifications from the described embodiments may be possible. Additionally, it should be understood that references to "one implementation", "one embodiment", "an implementation", "an embodiment", etc., within the present disclosure are not to be interpreted as excluding the existence of additional embodiments and implementations that also incorporate some or all of the recited features.

Moreover, some examples discussed herein may involve technologies associated with the oilfield services industry. It will be understood however that the techniques of multiphase flow metering may also be useful in a wide range of other industries outside the oilfield services sector, including for example, mining, geological surveying, etc.

As described herein, various techniques and technologies associated with reference temperature sensors and heated temperature sensors can be used to construct multiphase flow metering systems, including in downhole environments. Such multiphase flow metering systems can be used, for example, to provide a reservoir engineer with a better understanding of a behavior of a well by measuring and/or detecting various phases (i.e. oil, water, gas) in multiphase flow in production tubing associated with the well.

Example Wellsite

Figure 1:
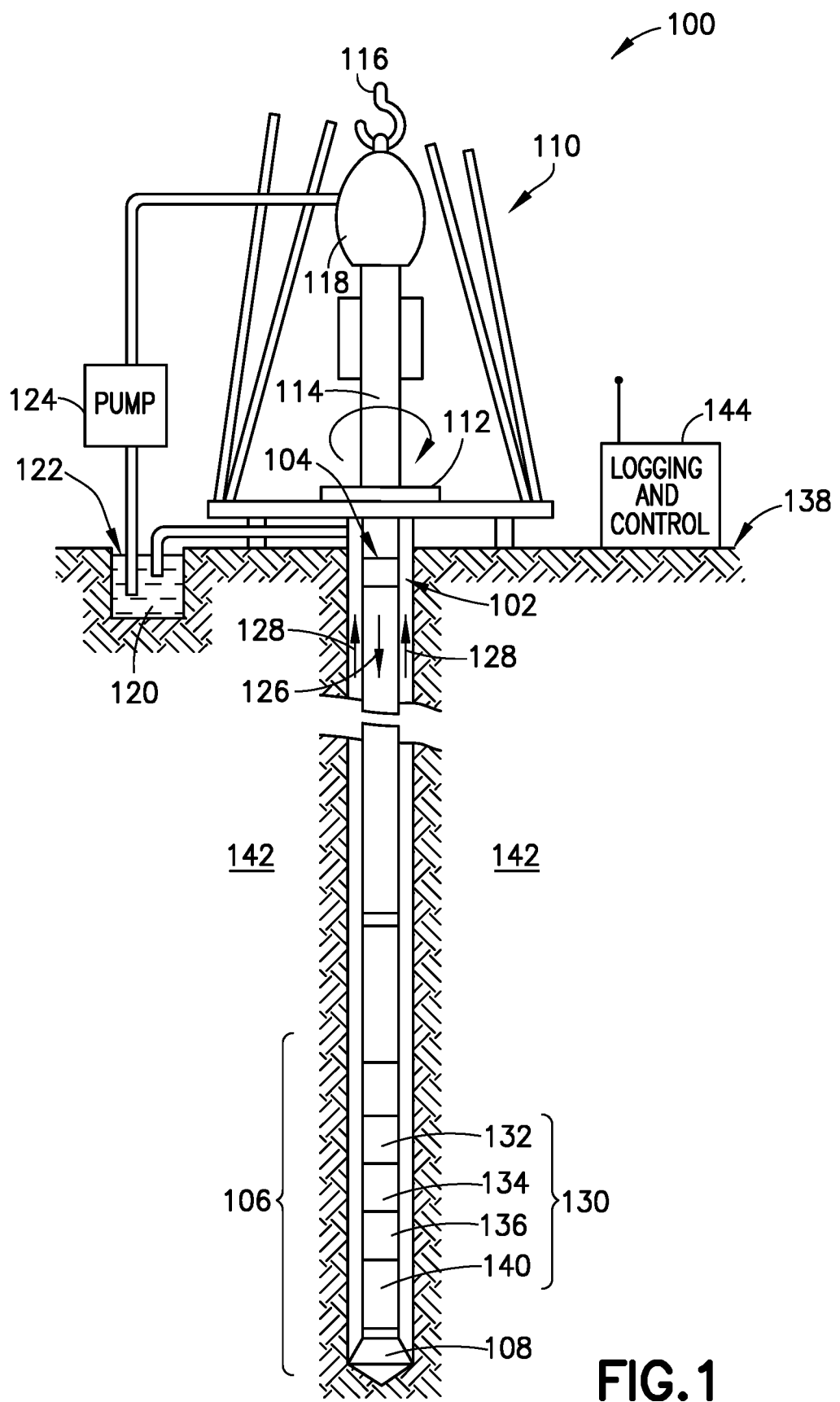
FIG. 1 illustrates an example wellsite in which embodiments of multiphase flow metering can be employed.

FIG. 1 illustrates a wellsite 100 in which embodiments of multiphase flow metering can be employed. Wellsite 100 can be onshore or offshore. In this example system, a borehole 102 is formed in a subsurface formation by rotary drilling in a manner that is well known. Embodiments of multiphase flow metering can also be employed in association with wellsites where directional drilling is being conducted.

A drill string 104 can be suspended within borehole 102 and have a bottom hole assembly (BHA) 106 including a drill bit 108 at its lower end. The surface system can include a platform and derrick assembly 110 positioned over the borehole 102. The assembly 110 can include a rotary table 112, kelly 114, hook 116 and rotary swivel 118. The drill string 104 can be rotated by the rotary table 112, energized by means not shown, which engages kelly 114 at an upper end of drill string 104. Drill string 104 can be suspended from hook 116, attached to a traveling block (also not shown), through kelly 114 and a rotary swivel 118 which can permit rotation of drill string 104 relative to hook 116. As is well known, a top drive system can also be used.

In the example of this embodiment, the surface system can further include drilling fluid or mud 120 stored in a pit 122 formed at wellsite 100. A pump 124 can deliver drilling fluid 120 to an interior of drill string 104 via a port in swivel 118, causing drilling fluid 120 to flow downwardly through drill string 104 as indicated by directional arrow 126. Drilling fluid 120 can exit drill string 104 via ports in drill bit 108, and circulate upwardly through the annulus region between the outside of drill string 104 and wall of the borehole 102, as indicated by directional arrows 128. In this well-known manner, drilling fluid 120 can lubricate drill bit 108 and carry formation cuttings up to the surface as drilling fluid 120 is returned to pit 122 for recirculation.

Bottom hole assembly 106 of the illustrated embodiment can include drill bit 108 as well as a variety of equipment 130, including a logging-while-drilling (LWD) module 132, a measuring-while-drilling (MWD) module 134, a rotary-steerable system and motor, various other tools, etc.

In one possible implementation, LWD module 132 can be housed in a special type of drill collar, as is known in the art, and can include one or more of a plurality of known types of logging tools (e.g., a nuclear magnetic resonance (NMR) system), a directional resistivity system, and/or a sonic logging system, etc.). It will also be understood that more than one LWD and/or MWD module can be employed (e.g. as represented at position 136). (References, throughout, to a module at position 132 can also mean a module at position 136 as well). LWD module 132 can include capabilities for measuring, processing, and storing information, as well as for communicating with surface equipment.

MWD module 134 can also be housed in a special type of drill collar, as is known in the art, and include one or more devices for measuring characteristics of the well environment, such as characteristics of the drill string and drill bit. MWD module 134 can further include an apparatus (not shown) for generating electrical power to the downhole system. This may include a mud turbine generator powered by the flow of drilling fluid 120, it being understood that other power and/or battery systems may be employed. MWD module 134 can include one or more of a variety of measuring devices known in the art including, for example, a weight-on-bit measuring device, a torque measuring device, a vibration measuring device, a shock measuring device, a stick slip measuring device, a direction measuring device, and an inclination measuring device.

MWD tools in MWD module 134, and LWD tools in LWD module 132 can include one or more characteristics common to wireline tools (e.g., transmitting and receiving antennas, sensors, etc.), with MWD and LWD tools being designed and constructed to endure and operate in the harsh environment of drilling.

Various systems and methods can be used to transmit information (data and/or commands) from equipment 130 to a surface 138 of the wellsite 100. In one implementation, information can be received by one or more sensors 140. The sensors 140 can be located in a variety of locations and can be chosen from any sensing and/or detecting technology known in the art, including those capable of measuring various types of radiation, electric or magnetic fields, including electrodes, magnetometers, coils, etc.

In one possible implementation, information from equipment 130, including LWD data and/or MWD data, can be utilized for a variety of purposes including steering drill bit 108 and any tools associated therewith, characterizing a formation 142 surrounding borehole 102, characterizing fluids within borehole 102, etc. For example, information from equipment 130 can be used to create one or more sub-images of various portions of borehole 102.

In one implementation a logging and control system 144 can be present. Logging and control system 144 can receive and process a variety of information from a variety of sources, including equipment 130. Logging and control system 144 can also control a variety of equipment, such as equipment 130 and drill bit 108.

Logging and control system 144 can also be used with a wide variety of oilfield applications, including logging while drilling, artificial lift, measuring while drilling, wireline, etc., and can include one or more processor-based computing systems. In the present context, a processor may include a microprocessor, programmable logic devices (PLDs), field-gate programmable arrays (FPGAs), application-specific integrated circuits (ASIC s), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from equipment 130, and so on.

Logging and control system 144 can be located at surface 138, below surface 138, proximate to borehole 102, remote from borehole 102, or any combination thereof. For example, in one possible implementation, information received by equipment 130 and/or sensors 140 can be processed by logging and control system 144 at one or more locations, including any configuration known in the art, such as in one or more handheld devices proximate and/or remote from wellsite 100, at a computer located at a remote center, a computer located at wellsite 100, etc.

In one aspect, logging and control system 144 can be used for the efficient production control of well 102. For example, information associated with a multiphase flow in well 102 can be interpreted at logging and control system 144, such that valves, including in flow control valves, can be choked to prevent and/or lessen the deleterious effects of any byproducts (such as water, gas, etc.) in the multiphase flow. This can include choking the valves to prevent and or slow the development of a toe-to-heel effect in a portion of well 102 (such as a horizontal or lateral well originating from well 102). Logging and control system 144 can fulfill such operations with or without the help of a user.

Example Computing Device

Figure 2:
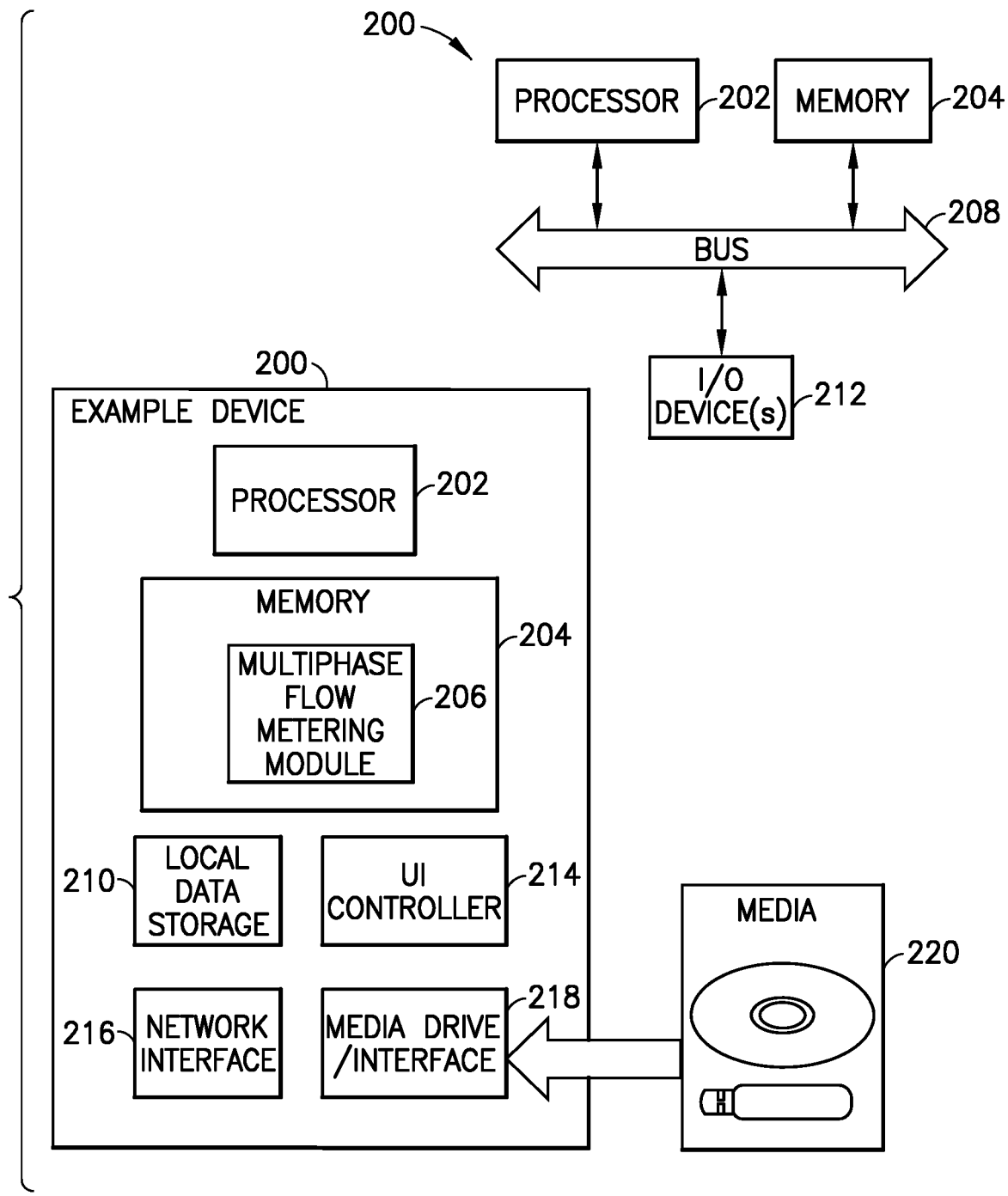
FIG. 2 illustrates an example computing device which can be used in conjunction with various embodiments of multiphase flow metering.

FIG. 2 illustrates an example device 200, with a processor 202 and memory 204 for hosting a multiphase flow metering module 206 configured to implement various embodiments of multiphase flow metering as discussed in this disclosure. Memory 204 can also host one or more databases and can include one or more forms of volatile data storage media such as random-access memory (RAM), and/or one or more forms of nonvolatile storage media (such as read-only memory (ROM), flash memory, and so forth).

Device 200 is one example of a computing device or programmable device, and is not intended to suggest any limitation as to scope of use or functionality of device 200 and/or its possible architectures. For example, device 200 can comprise one or more desktop computers, programmable logic controllers (PLCs), laptop computers, handheld devices, mainframe computers, high-performance computing (HPC) clusters, clouds, etc., including any combination thereof.

Further, device 200 should not be interpreted as having any dependency relating to one or a combination of components illustrated in device 200. For example, device 200 may include one or more of a computer, such as a laptop computer, a desktop computer, a mainframe computer, an HPC cluster, cloud, etc., or any combination or accumulation thereof.

Device 200 can also include a bus 208 configured to allow various components and devices, such as processors 202, memory 204, and local data storage 210, among other components, to communicate with each other.

Bus 208 can include one or more of any of several types of bus structures, including a memory bus or memory controller, a peripheral bus, an accelerated graphics port, and a processor or local bus using any of a variety of bus architectures. Bus 208 can also include wired and/or wireless buses.

Local data storage 210 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 212 may also communicate via a user interface (UI) controller 214, which may connect with I/O device(s) 212 either directly or through bus 208.

In one possible implementation, a network interface 216 may communicate outside of device 200 via a connected network, and in some implementations, may communicate with hardware, such as equipment 130, one or more sensors 140, etc.

In one possible embodiment, equipment 130 may communicate with device 200 as input/output device(s) 212 via bus 208, such as via a USB port, for example.

A media drive/interface 218 can accept removable tangible media 220, such as flash drives, optical disks, removable hard drives, software products, etc. In one possible implementation, logic, computing instructions, and/or software programs comprising elements of multiphase flow metering module 206 may reside on removable media 220 readable by media drive/interface 218.

In one possible embodiment, input/output device(s) 212 can allow a user to enter commands and information to device 200, and also allow information to be presented to the user and/or other components or devices. Examples of input device(s) 212 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of multiphase flow metering module 206 may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In one possible implementation, device 200, or a plurality thereof, can be employed at wellsite 100. This can include, for example, in various equipment 130, in logging and control system 144, etc.

Example System(s) and/or Technique(s)

When a multiphase flow comprising oil and/or gas and/or water is flowing in production tubing, various volume fractions, such as "water cut" and "gas cut", can be measured using different physical principles. This can include, for example, measuring functions of water content in the multiphase flow, such as the electrical resistivity and/or capacitance of the multiphase flow.

However, in some instances, electric measurements can struggle to distinguish between gas and oil contents in a multiphase flow. For example, capacitance measurements can provide an accurate water volume fraction in the range of approximately 0%-30%. Similarly, resistivity measurements can provide a water cut measurement in the range of approximately 60%-100%. Therefore, if both methods are used, the information about the remaining range of water cut in the multiphase flow—approximately 30%-50%—can remain inaccurate due to the complex dynamics of the mixture in the multiphase flow where phase inversion might be occurring.

Therefore, other techniques, such as those described herein, can be useful in providing more information regarding various phase flow characteristics of the multiphase flow including, for example, the presence of gas in the multiphase flow, the total flow rate of the multiphase flow, the individual phase volume fractions within the multiphase flow, etc. In one possible implementation, various temperature sensors such as, for example, resistance-temperature detectors (RTD), can be utilized by such techniques.

Figure 3:
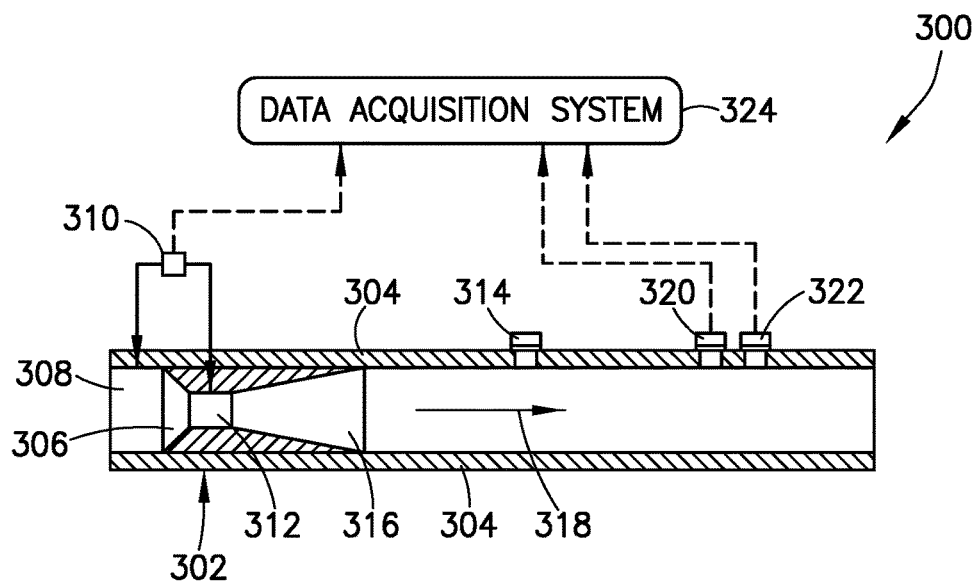
FIG. 3 illustrates an example multiphase flow measurement system in accordance with various embodiments of multiphase flow metering.

FIG. 3 illustrates an example multiphase flow measurement system 300 in accordance with various embodiments of multiphase flow metering. As illustrated, multiphase flow measurement system 300 includes a Venturi nozzle 302 configured to mix a multiphase flow flowing inside of a length of production tubing 304. Both Venturi nozzle 302 and production tubing 304 can take any forms known in the art and can be constructed from any materials known in the art. Moreover, production tubing 304 can be located downhole and/or on the surface of a well.

In one possible implementation, an inlet 306 of Venturi nozzle 302 can be proximate an intake end 308 of production tubing 304, though it will be understood that inlet 306 of Venturi nozzle 302 can be located at other positions within production tubing 304 as well.

One or more differential pressure measurement sensors 310, such as Venturi flow meters, can measure a pressure difference across inlet 306 and a throat 312 of Venturi nozzle 302.

Multiphase flow measurement system 300 can also include one or more water cut sensor(s) 314 located downstream of an outlet 316 of Venturi nozzle 302. Water cut sensor(s) 314 can take any form known in the art, including a probe, and can be based on, for example, resistivity and/or capacitance measurements of the multiphase flow passing through production tubing 304.

Several temperature sensors can be located downstream of water cut sensor(s) 314 in the direction of flow 318 of the multiphase flow in production tubing 304. These can include one or more reference temperature sensors 320 and one or more heated temperature sensors 322. Reference temperature sensor(s) 320 can include any type of temperature sensors known in the art that can be used in a production tubing environment including, for example, a resistance temperature detector (RTD). Similarly, heated temperature sensor(s) 322 can include any type of temperature sensors known in the art that can both excite and measure a temperature of the multiphase flow proximate thereto, such as, for example, a heated resistance temperature detector (RTD).

Additionally, even though reference temperature sensor(s) 320 and heated temperature sensor(s) 322 are shown in FIG. 3 as being located on a top side of production tubing, 304 it will be understood that reference temperature sensor(s) 320 and heated temperature sensors 322 can also be placed anywhere else about a circumference of production tubing 304, including on a bottom, on sides, and/or any combination thereof.

Temperature sensor(s) 320 and heated temperature sensor(s) 322 can be flush-mounted on a wall of production tubing 304 and/or protrude to an extent desired from production tubing 304 into the multiphase flow flowing through production tubing 304. Moreover, heated temperature sensor(s) 322 can be located downstream of reference temperature sensor(s) 320.

In one possible implementation, reference temperature sensor(s) 320 and heated temperature heated temperature sensor(s) 322 can be placed as close together as possible. In some aspects this can include spacings of approximately 10-12 mm from center to center of the various temperature sensors 320, 322.

Components of multiphase flow measurement system 300 which include Venturi nozzle 302, differential pressure measurement sensor(s) 310, water cut sensor(s) 314, reference temperature sensor(s) 320 and heated temperature sensor(s) 322) can be installed into existing production tubing 304, or can be installed as a separate device connected to the production tubing by any connection technologies known in the art, including, for example, flanges, welding, etc.

Multiphase flow measurement system 300 can also be connected to and/or include a data acquisition system 324 configured to record data and/or measurements produced by one or more of the components of multiphase flow measurement system 300. For example, data acquisition system 324 can be configured to record differential pressures P produced by differential pressure measurement sensor(s) 310; water volume fraction (water cut) $\phi_w$, produced by water cut sensor(s) 314; reference temperature(s) $T_{ref}$ of the mixed flow, produced by reference temperature sensor(s) 320; and the temperatures of the multiphase flow associated with the heated sensor $T_s$ with time t produced heated temperature sensor(s) 322. In one possible embodiment, all or portions of data acquisition system 324 can be located in logging and control system 144.

In one possible implementation, the data and/or measurements produced by one or more of the components of multiphase flow measurement system 300 can be used to calculate one or more phase flow characteristics of the multiphase flow including, for example, the presence of gas in the multiphase flow, the total flow rate of the multiphase flow, the individual phase volume fractions within the multiphase flow, etc.

For example, water cut, $\phi_w$ associated with the multiphase flow in production tubing 304 can be measured by water cut sensor(s) 314. In two-phase flow (oil and water) without gas, a total flow rate $Q_t$, of the multiphase flow can be measured by using the water cut information $\phi_w$ and the differential pressure P between inlet 306 and throat 312 of Venturi nozzle 302. In one possible aspect, Venturi nozzle 302 can serve to mix multiphase flow into a homogenous multiphase flow near the temperature sensors 320, 322.

In one possible embodiment, reference temperature sensor(s) 320 downstream of Venturi nozzle 302 can be operated in passive mode to measure a reference temperature of the mixed flow $T_{ref}$. Heated temperature sensor(s) 322, downstream of reference temperature sensor(s) 320, can be operated in active mode, (i.e. heated temperature sensor(s) 322 are heated by electrical power $P_w$, such as, for example, in a range between 0.01-1 Watt, which can be continuous or pulsed).

Electrical power $P_w$ can be applied in a variety of manners, including, for example, by exciting heated temperature sensor(s) 322 with a continuous or pulsed electrical current. This electrical power can excite the mixed flow and due to the excitation, heated temperature sensor(s) 322 can measure a temperature $T_s$ which is higher than $T_{ref}$. In one possible implementation, heated temperature sensor(s) 322 can measure $T_s$ instantaneously with the excitement of the mixed flow.

In one possible aspect, the maximum temperature rise $T_{ow} = T_s T_{ref}$ attainable by heated temperature sensor(s) 322 can be associated with the thermal properties of the mixed flow, including, for example, the thermal conductivity, $k_m$, and the heat capacity $Cp_m$ of the mixed flow.

In one possible implementation, when gas enters production tubing 304 and is mixed with the existing phases of the mixed flow, the thermal properties of the mixed flow will change, namely the oil/water/gas mixture in the mixed flow will have a heat capacity lower than the previous oil/water mixture. Thus, the same amount of energy will warm up the oil/water/gas mixture more than it would the oil/water mixture. Therefore, the recorded temperature rise for the oil/water/gas mixture will be higher than the recorded temperature rise for the oil/water mixture (i.e., $T_{owg} > T_{ow}$).

Figure 4:
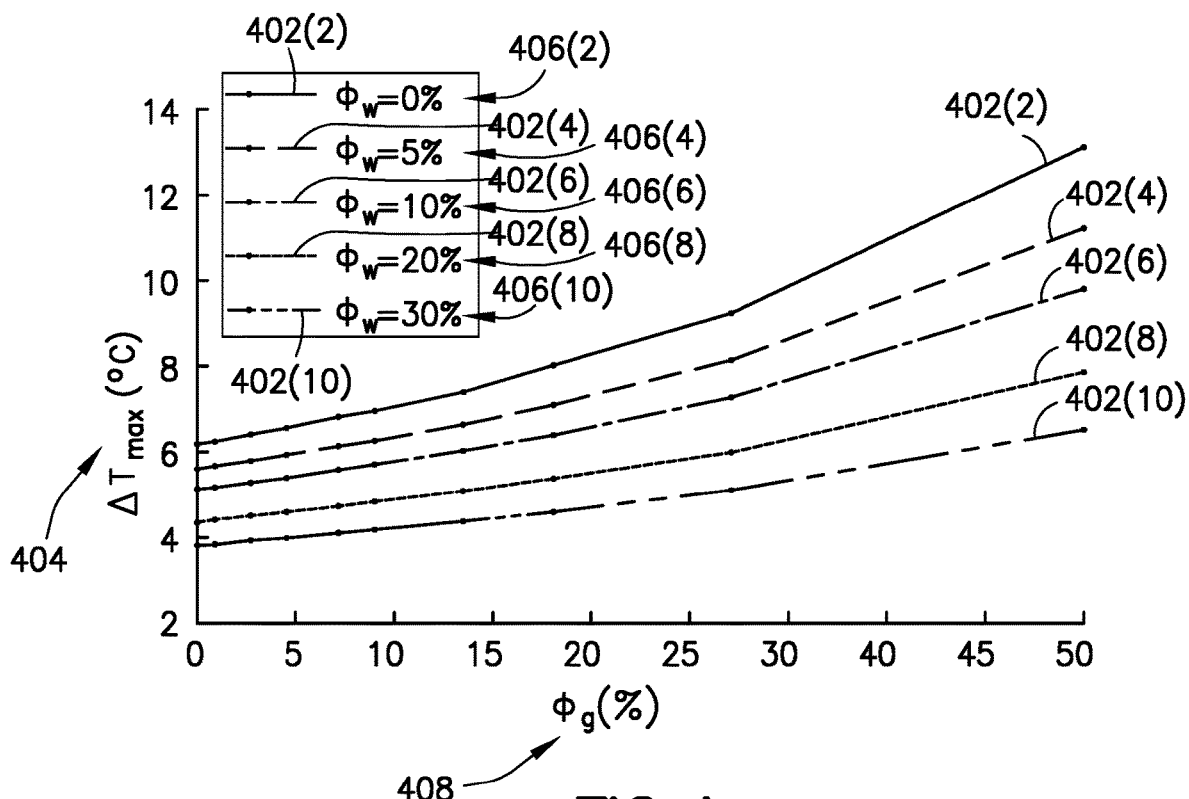
FIG. 4 illustrates an example graph of temperature rise as a function of water cut and gas fraction in accordance with embodiments of multiphase flow metering.

FIG. 4 plots several graphs 402 of temperature rise 404 against various water volume fractions 406 and gas volume fractions 408 in the mixed multiphase flow. As can be seen, when the multiphase flow is under steady state flow conditions, increases in T in the mixed flow can be used to infer the presence and/or amount of gas in the multiphase flow in production tubing 304.

Figure 5:
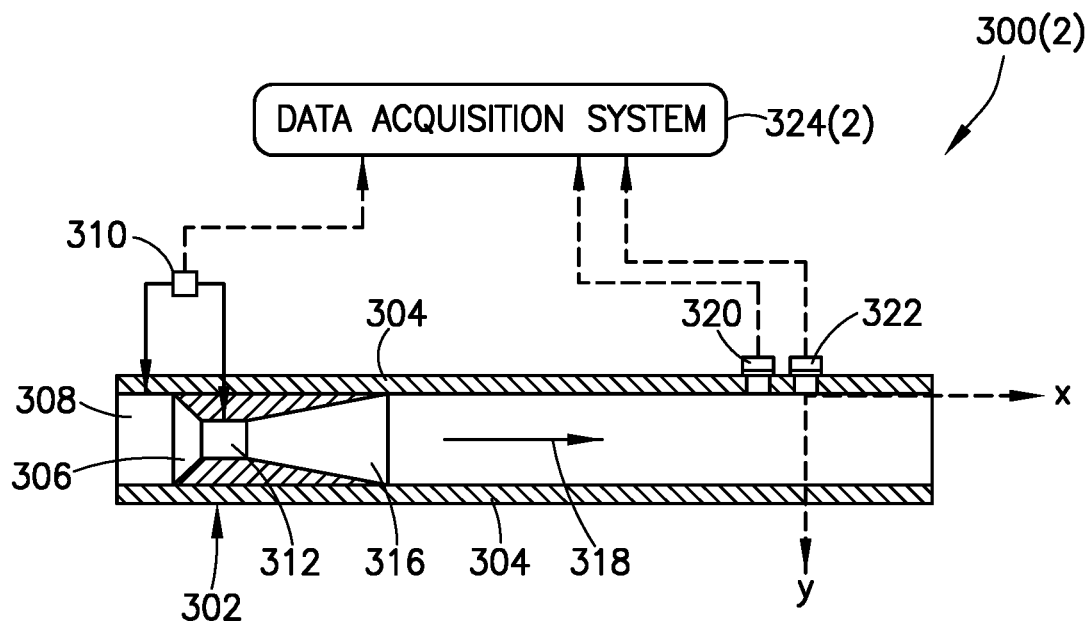
FIG. 5 illustrates an example multiphase flow measurement system in accordance with various embodiments of multiphase flow metering.

FIG. 5 illustrates another example multiphase flow measurement system 300(2) in accordance with various embodiments of multiphase flow metering. In one possible implementation, multiphase flow measurement system 300(2) is configured to characterize a 3-phase flow by measuring the total flow rate and the individual phase fractions of a mixed multiphase flow in production tubing 304.

As illustrated in FIG. 5, water cut sensor(s) 314 can be excluded from multiphase flow measurement system 300(2). Otherwise, multiphase flow measurement system 300(2) is similar to multiphase flow measurement system 300 in that multiphase flow measurement system 300(2) includes components such as Venturi nozzle 302, one or more differential pressure measurement sensor(s) 310, reference temperature sensor(s) 320, heated temperature sensor(s) 322 and a data acquisition system 324(2). Moreover, the components in multiphase flow measurement system 300(2) can be configured and/or located in a manner similar to that as illustrated with regard to multiphase flow measurement system 300. Moreover, multiphase flow measurement system 300(2) can be constructed and deployed in manners similar to those associated with multiphase flow measurement system 300, as described above.

In one possible implementation, reference temperature sensor(s) 320 can be operated in passive mode to measure the reference temperature, $T_{ref}$ of the mixed multiphase flow in production tubing 304, and heated temperature sensor(s) 322 can be operated in active mode to measure the temperature response, $T_s$ due to excitation of the mixed multiphase flow proximate the heated temperature sensor(s) 322 arising from a short time pulse of electrical power applied to heated temperature sensor(s) 322.

In one possible aspect, various characteristics of the individual phases in the mixed multiphase flow in production tubing 304, namely water, oil and gas can be assumed to be known by prior measurement/calibration (including, for example, via pressure, volume, temperature (PVT) analyses conducted on samples of the multiphase flow, or associated well fluids, in a surface laboratory, etc.). The various characteristics can include densities ($\rho_w$, $\rho_o$, $\rho_g$) of the water, oil and gas components of the multiphase flow; viscosities ($\mu_w$, $\mu_o$, $\mu_g$) of the water, oil and gas components of the multiphase flow; thermal conductivities ($k_w$, $k_o$, $k_g$) of the water, oil and gas components of the multiphase flow; specific heat capacities ($Cp_w$, $Cp_o$, $Cp_g$) of the water, oil and gas components of the multiphase flow; and thermal diffusivities ($\alpha_w$, $\alpha_o$, $\alpha_g$) of the water, oil and gas components of the multiphase flow.

In one possible implementation, the characteristics of the oil/water/gas mixture can be given as follows by a linear mixing rule:

$$\rho_m = \rho_w \phi_w + \rho_g \phi_g + \rho_o (1 - \phi_w - \phi_g), \quad (1)$$

$$\mu_m = \mu_w \phi_w + \mu_g \phi_g + \mu_o (1 - \phi_w - \phi_g), \quad (2)$$

$$k_m = k_w \phi_w + k_g \phi_g + k_o (1 - \phi_w - \phi_g), \quad (3)$$

$$Cp_m = Cp_w \phi_w + Cp_g \phi_g + Cp_o (1 - \phi_w - \phi_g), \quad (4)$$

$$\alpha_m = \frac{k_m}{\rho_m Cp_m}. \quad (5)$$

where $\phi_w$ and $\phi_g$ are respectively the average water and gas volume fractions in production tubing 304. It will be noted that the oil volume fraction is written in equations (1)-(4) above as $\phi_o = 1 - \phi_w - \phi_g$.

In one possible implementation, when the three-phase mixed multiphase flow mixture is flowing in production tubing 304, three unknowns can be determined:
The mixture velocity $U_m$
Water volume fraction: $\phi_w$
Gas volume fraction: $\phi_g$ Once these unknowns are determined, the volumetric flow rate of each phase can be calculated as follows:
Mixture total flow rate: $Q_t = AU_m$ where A is the cross section of Venturi inlet 306
Water flow rate: $Q_w = \phi_w Q_t$
Gas flow rate: $Q_g = \phi_g Q_t$
Oil flow rate: $Q_o = \phi_o Q_t = (1 - \phi_w - \phi_g) Q_t$ Thus, three equations can be determined from multiphase flow measurement system 300(2). For instance, the first equation can be obtained from a Venturi flow meter associated with Venturi nozzle 302, where the velocity of the mixed multiphase flow can be written as follows:

$$U_m = C_D \frac{\beta^2}{\sqrt{1-\beta^4}} \sqrt{\frac{2P}{\rho_m}}, \quad (6)$$

where, P is the measured differential pressure measured by differential pressure measurement sensor 310, and $\beta$ is the Venturi inlet-to-throat diameter ratio (a design parameter that in one possible aspect will be known by an operator of multiphase flow measurement system 300(2)). $\rho_m$ is the density of the mixed multiphase flow (as found in Eq. 1), and $C_D$ is the Venturi discharge coefficient which is a function of the velocity $U_m$ of the multiphase flow, the density $\rho_m$ of the multiphase flow and viscosity $\mu_m$ such as $C_D = C_D(U_m, \rho_m, \mu_m)$. Knowing that the density and the viscosity of the multiphase flow are given by Eqs. (1) and (2), the velocity of the multiphase flow mixture can be simplified as a function of the differential pressure and water and gas volume fractions:

$$U_m = f(P, \phi_w, \phi_g) \quad (7)$$

In one possible implementation, reference temperature sensor(s) 320 and heated temperature sensor(s) 322 can be considered to be in perfect contact with the multiphase flow and be small enough compared to the diameter of production tubing 304 to not exhibit an undue influence on the multiphase flow. Therefore, each heated temperature sensor 322 can be considered a spherical point heat source excited by an instantaneous pulse, $P_w$ during a very short heating time, $t_h$. The temperature distribution at a point of the interface sensor/mixture located at a distance $r_i = \sqrt{x_i^2 + y_i^2 + z_i^2}$ from the center of the heated temperature sensor 322 is given by the equation:

$$T = T_s - T_{ref} \qquad (8)$$
$$= \frac{P_w \cdot t_h}{8k_m \sqrt{\alpha_m} (\pi t)^{3/2}} \exp\left(\frac{x_i U_m}{2\alpha_m}\right) \exp\left[\frac{(r_i^2 - (U_m t)^2)}{4\alpha_m t}\right]$$

It will be noted that if the assumptions made above regarding perfect contact, size and shape of reference temperature sensor(s) 320 and heated temperature sensor(s) 322 cannot be made, Eq. 8 can be altered/tailored.

Figure 6:
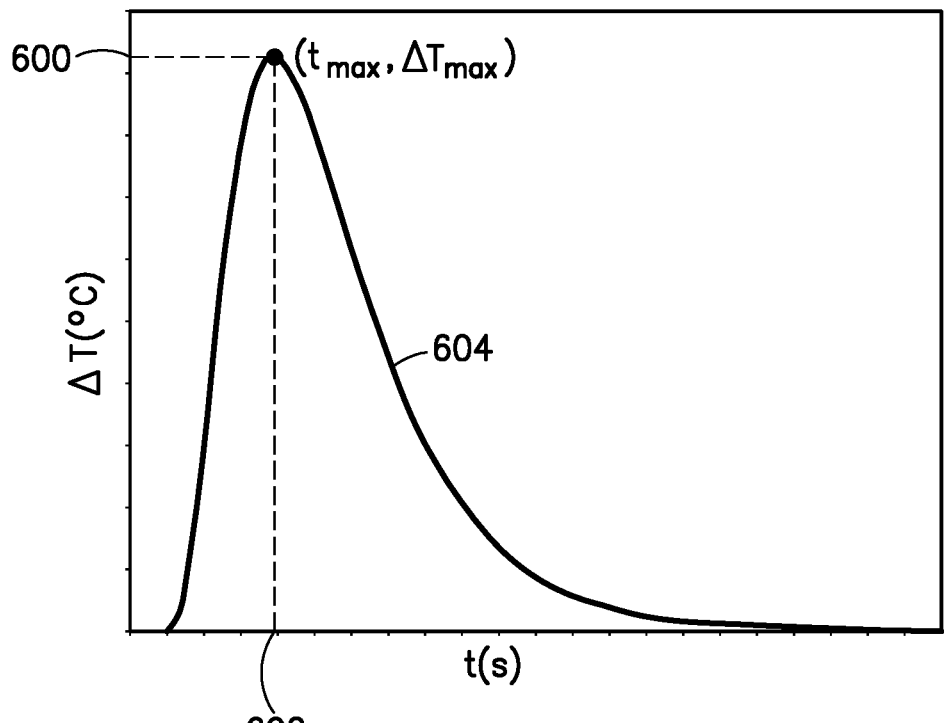
FIG. 6 illustrates an example graph of temperature versus time due to an instantaneous power pulse in accordance with embodiments of multiphase flow metering.

Due to the pulsed excitation at heated temperature sensor(s) 322, the temperature rise T will increase and reach a maximum $T_{max}$ 600 at a time $t_{max}$ 602, which can be obtained from the recorded temperature signal (similar to the recorded temperature signal 604 illustrated in FIG. 6). $t_{max}$ can also be obtained from the derivative of Eq. (8) such as:

$$\left.\frac{dT}{dt}\right|_{r=r_i} = 0 \rightarrow \alpha_m = \frac{r_i^2 - U_m^2 t_{max}^2}{6 t_{max}} \qquad (9)$$

Figure 7:
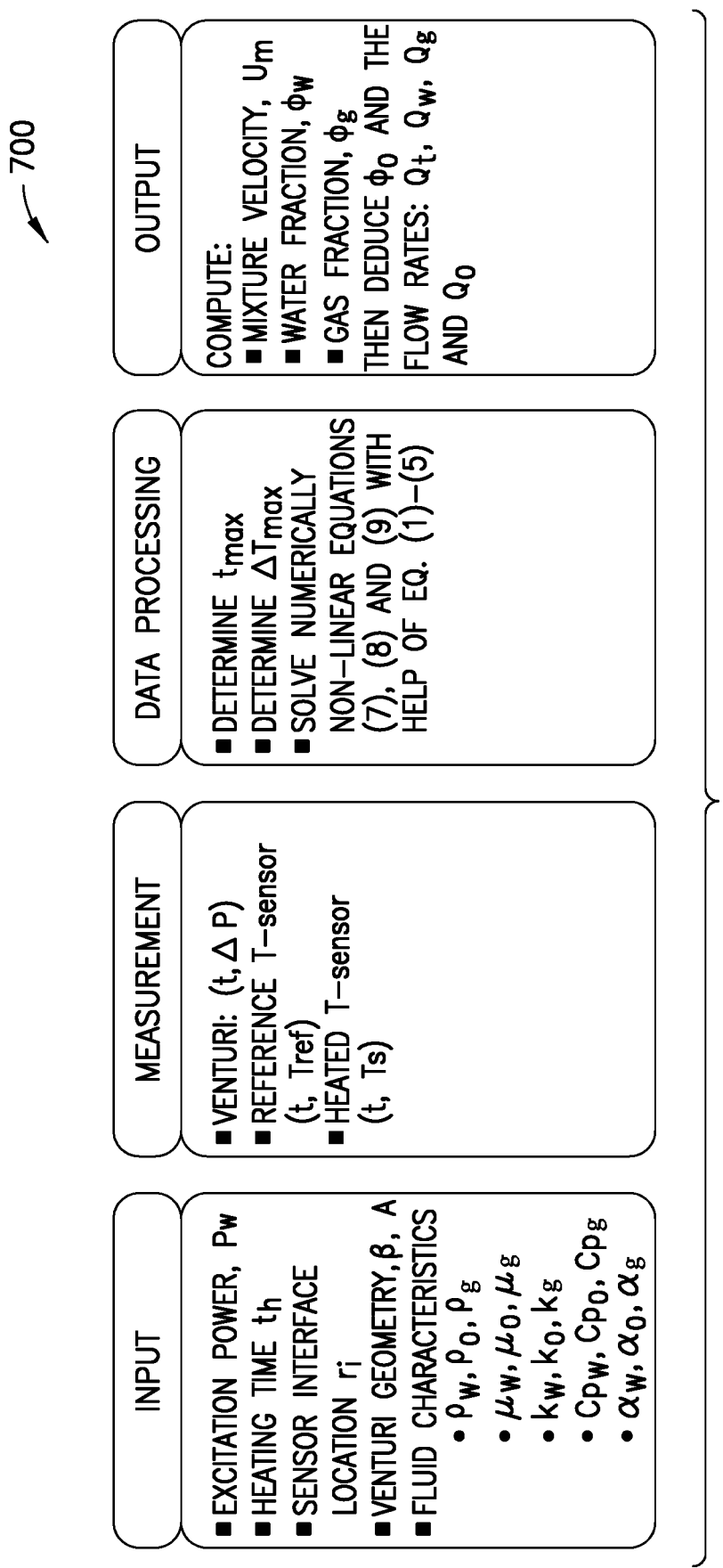
FIG. 7 illustrates an example workflow to measure three phase flow with a Venturi nozzle and two temperature sensors in accordance with embodiments of multiphase flow metering.

In one possible aspect, the determination of phase flow characteristics, such as the flow velocity and the phase fractions, can be obtained by numerically solving the set of equations (7), (8) and (9) where the unknowns are $U_m$, $\phi_w$ and $\phi_g$, and by taking into account Eq (1)-(5). An example workflow 700 for such a purpose is illustrated in FIG. 7.

Figure 8:
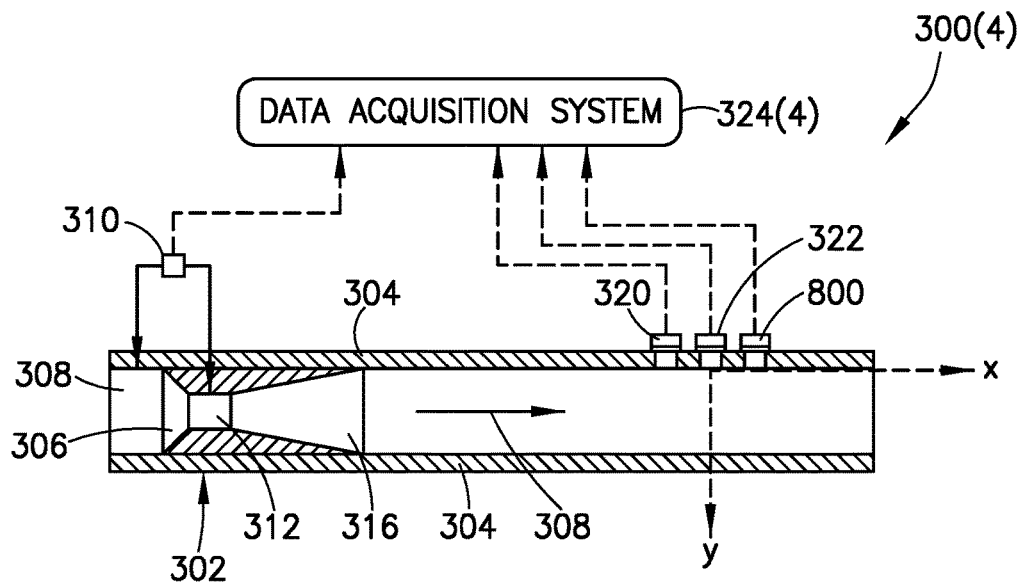
FIG. 8 illustrates an example multiphase flow measurement system in accordance with embodiments of multiphase flow metering.

FIG. 8 illustrates another example multiphase flow measurement system 300(4) in accordance with various embodiments of multiphase flow metering. Multiphase flow measurement system 300(4) is similar to multiphase flow measurement system 300(2), though multiphase flow measurement system 300(4) includes one or more passive temperature sensor(s) 800 downstream of heated temperature sensor(s) 322. Passive temperature sensor(s) 800 can include any type of temperature sensors known in the art that can be used in a production tubing environment including, for example, a resistance temperature detector (RTD).

Additionally, even though passive temperature sensor(s) 800 are illustrated as being located on a top side of production tubing 304, it will be understood that passive temperature sensor(s) 800 can also be placed anywhere else about a circumference of production tubing 304, including on a bottom, on sides, and/or any combination thereof.

Moreover, passive temperature sensor(s) 800 can be flush-mounted on a wall of production tubing 304 and/or protrude to an extent desired from production tubing 304 into the mixed multiphase flow in production tubing 304. And in one possible implementation, reference temperature sensor(s) 320, heated temperature sensor(s) 322, and/or passive temperature sensor(s) 800 can be placed as close together as possible. In some aspects this can include spacings of approximately 10-12 mm from center to center of the various temperature sensors 320, 322, 800.

As can be seen in FIG. 8, multiphase flow measurement system 300(4) is similar to multiphase flow measurement system 300(2) in that multiphase flow measurement system 300(4) includes elements such as Venturi nozzle 302, one or more differential pressure measurement sensor(s) 310, reference temperature sensor(s) 320, heated temperature sensor(s) 322 and a data acquisition system 324(4), wherein the various elements can be configured and/or located in multiphase flow measurement system 300(4) in a manner similar to that found in multiphase flow measurement system 300(2). Moreover, multiphase flow measurement system 300(4) can be constructed and deployed in manners similar to those associated with multiphase flow measurement system 300(2), as described above.

In one possible implementation, the temperature $T_{s2}$ of the mixed multiphase flow in production tubing measured by additional passive temperature sensor(s) 800 can be recorded by acquisition system 324(2). Heated temperature sensor(s) 322 can be excited by an instantaneous pulsed power $P_w$ source.

Figure 9:
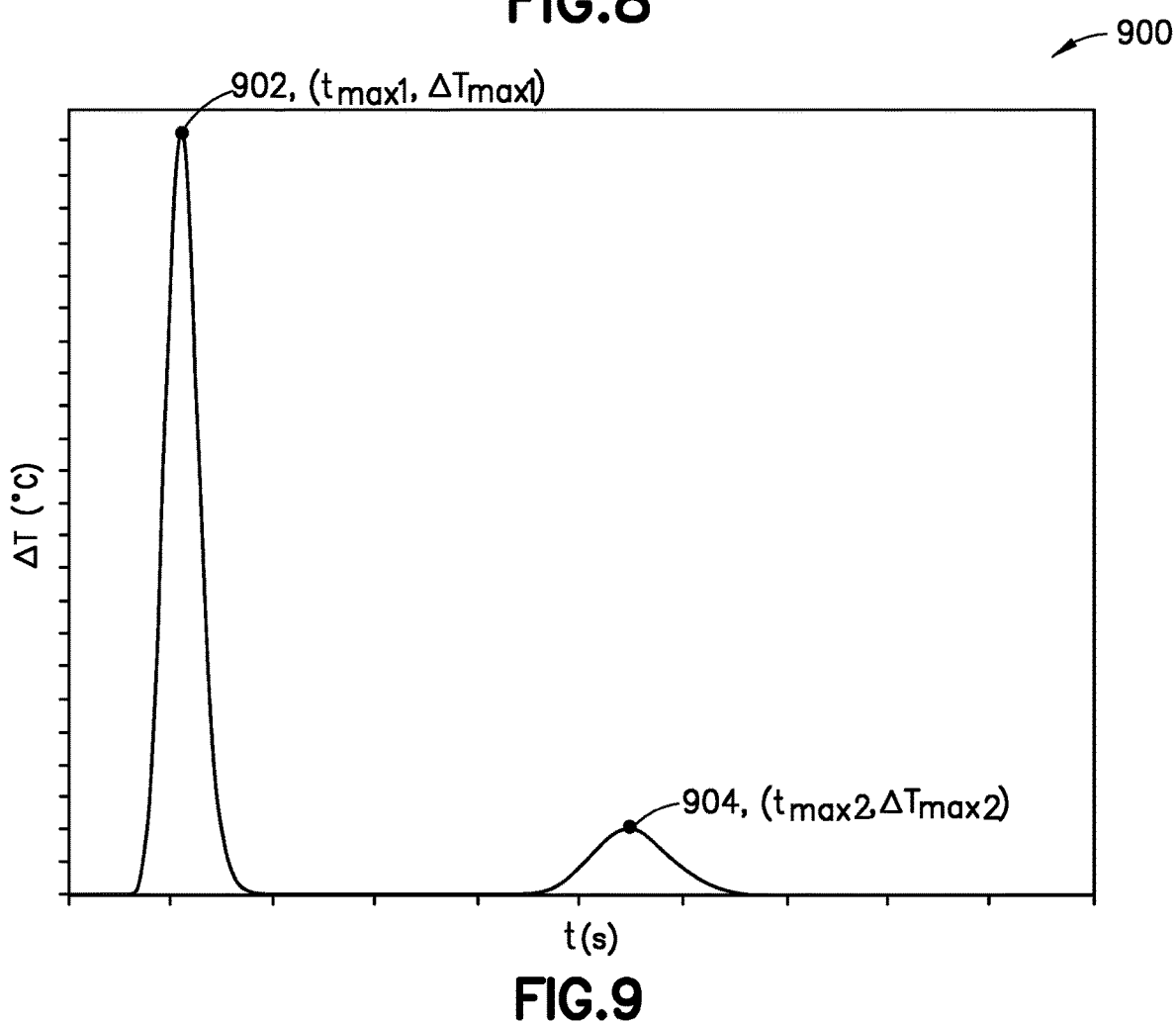
FIG. 9 illustrates an example graph of temperature versus time due to an instantaneous power pulse as measured by two temperature sensors in accordance with embodiments of multiphase flow metering.

In one possible embodiment, to determine the three unknowns $U_m$, $\phi_w$ and $\phi_g$, the maximum temperature rise at each sensor, $T_{max1}$ and $T_{max2}$ occurring respectively at $t_{max1}$ and $t_{max2}$ can be measured from their corresponding recorded signals. In one possible aspect, this can be done using, for example, a recorded signal graph 900, such as illustrated in FIG. 9. As shown, a maximum temperature rise $T_{max1}$ 902 can be measured at heated temperature sensor(s) 322 at time at $t_{max1}$ and a maximum temperature rise $T_{max2}$ 904 can be measured at passive temperature sensor(s) 800 at time $t_{max2}$.

In another possible aspect, $t_{max1}$ and $t_{max2}$ can be determined from the derivative of Eq. (8) at the locations $r_{i1}$ and $r_{i2}$ (i.e., distances, respectively, of given points on the interface/sensor fluid for each heated temperature sensor 322 and passive temperature sensor 800) such as:

$$\alpha_m = \frac{r_{i1}^2 - U_m^2 t_{max1}^2}{6 t_{max1}} = \frac{r_{i2}^2 - U_m^2 t_{max2}^2}{6 t_{max2}} \qquad (10)$$

This enables the determination of the velocity and thermal diffusivity of the multiphase flow mixture:

$$U_m = \sqrt{\frac{r_{i2}^2 t_{max1} - r_{i1}^2 t_{max2}}{t_{max1} t_{max2}^2 - t_{max2} t_{max1}^2}} \qquad (11)$$

$$\alpha_m = \frac{r_{i2}^2 t_{max1}^2 - r_{i1}^2 t_{max2}^2}{6(t_{max1} t_{max2}^2 - t_{max2} t_{max1}^2)} \qquad (12)$$

Then, by using Eqs. (11) and (12), the thermal conductivity of the multiphase flow mixture $k_m$ can be computed from the temperature distribution equation (8). By doing so and taking into account Eqs. (1), (3), (4) and (5), the water and gas volume fractions can be computed.

It will be noted that in one possible implementation, the differential pressure P measured by differential pressure measurement sensor(s) 310 is not used to determine the velocity and the volume fractions. In this case Venturi nozzle 302 serves to mix the three phases and provide a homogenous mixture near reference temperature sensor(s) 320, heated temperature sensor(s) 322, and passive temperature sensor(s) 800. It will also be noted that P can also be used, via Eq. (6) to verify the accuracy of velocity determined from the temperature sensors.

Figure 10:
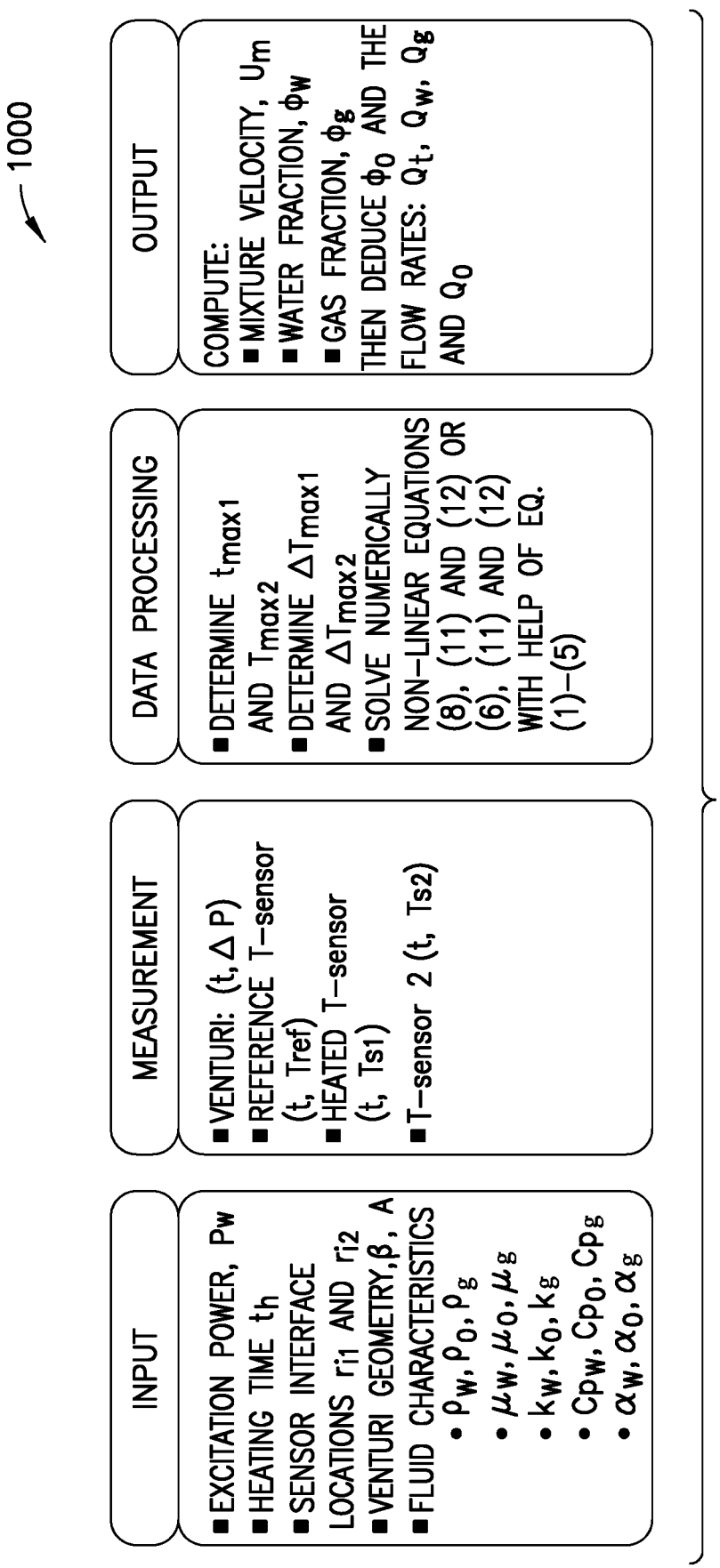
FIG. 10 illustrates an example workflow to measure three phase flow with a Venturi nozzle and three temperature sensors in accordance with embodiments of multiphase flow metering.

FIG. 10 illustrates an example workflow 1000 to measure three phase flow with a Venturi nozzle and three temperature sensors in accordance with embodiments of multiphase flow metering.

It will be understood that if desired, more heated temperature sensor(s) 322 and passive temperature sensor(s) 800 can be included in multiphase flow measurement system 300(4) downstream of the existing reference temperature sensor(s) 320, heated temperature sensor(s) 322 and passive temperature sensor(s) 800. Information collected from these sensors 322, 800 can be processed in the same manner as described above.

In one possible implementation, heated temperature sensor(s) 322 in multiphase flow measurement system 300(2) (as illustrated in FIG. 5) can be excited continuously by a constant $P_w$. Heated temperature sensor(s) 322 in such an embodiment can have different shapes, including points, squares, discs, ellipses, stars, spheres, rings (around the circumference of production tubing 304), etc.

In one possible implementation, if a heated temperature sensor 322 has a characteristic length $R_0$ (width, length, radius, etc.), the average temperature rise on the exchange surface of the sensor can be written in a simplified form as:

$$\frac{T}{T_{max}} = \frac{T_s \ T_{ref}}{T_{max}} = H(t, U_m, \alpha_m, R_0) \qquad (13)$$

Figure 11:
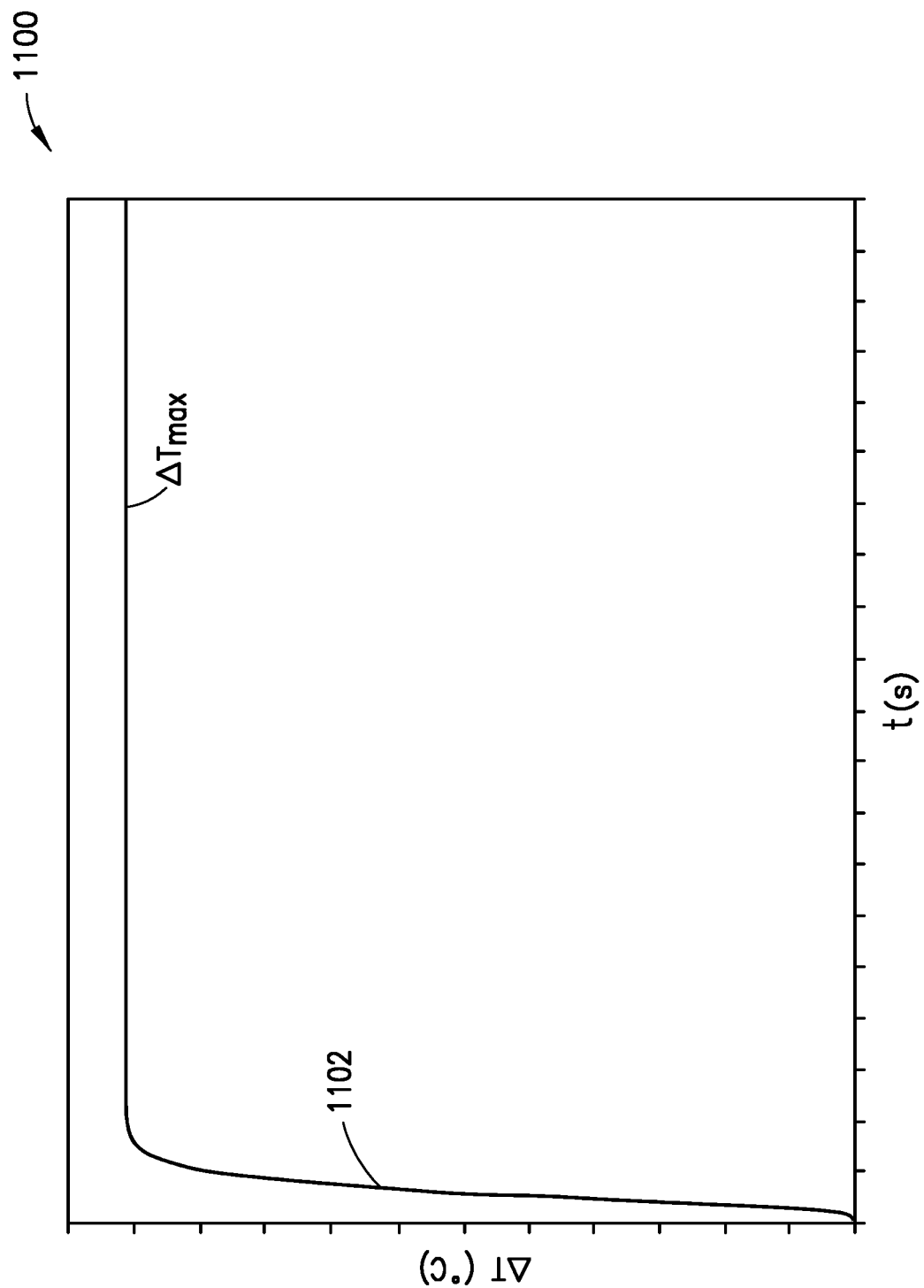
FIG. 11 illustrates an example graph of temperature versus time due to a continuous heat source in accordance with embodiments of multiphase flow metering.

FIG. 11 provides an example graph 1100 illustrating temperature rise 1102 due to such a continuous source of excitation. In Eq. (13), H can be a complex dimensionless function. In one possible aspect, H can be associated with a shape (i.e. point, line, disc, sphere, etc.) of the heat source, $R_0$ (i.e. heated temperature sensor 322) as well as the velocity $U_m$ of the multiphase flow mixture and its thermal diffusivity $\alpha_m$, H can be calculated.

The maximum temperature rise recorded by heated temperature sensor 322 can also be expressed in a general form as follows:

$$T_{max} = \frac{P_w}{2\sqrt{\pi} \ R_0 k_m} a_1 \left(\frac{U_m R_0}{\alpha_m}\right)^{-a_2} \qquad (14)$$

where $\alpha_1$ and $\alpha_2$ are coefficients associated with the shape of heated temperature sensor 233 and can be determined by prior calibration. Finally, by solving the set of non-linear equations (13), (14), and Eq. (6) obtained from the Venturi, the 3 unknowns $U_m$, $\phi_w$, and $\phi_g$ can be computed with the help of Eqs. (1)-(5).

Figure 12:
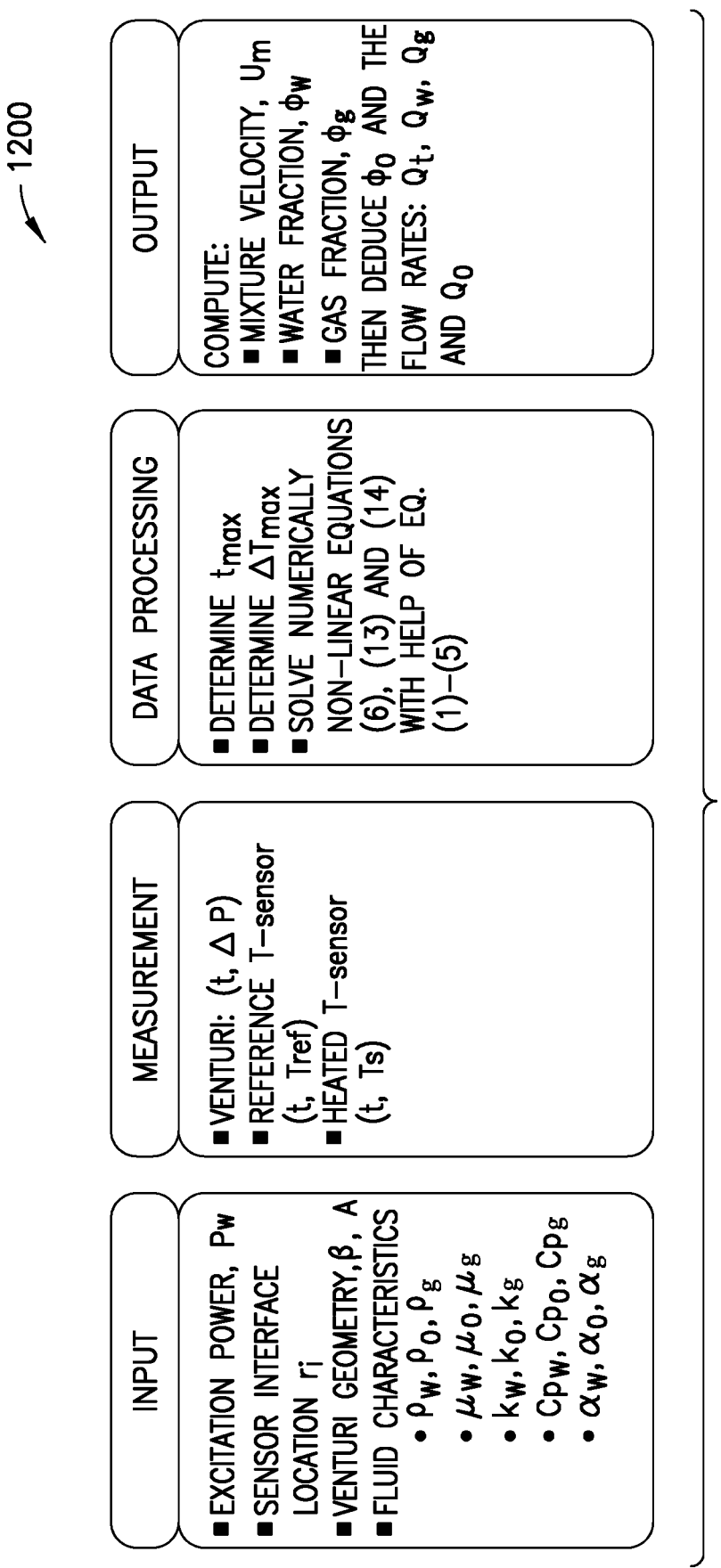
FIG. 12 illustrates an example workflow to measure three phase flow with a Venturi nozzle and two temperature sensors in accordance with embodiments of multiphase flow metering.

FIG. 12 illustrates an example workflow 1200 that can be used to measure three phase flow with Venturi nozzle 302 and two types of temperature sensors 320, 322, wherein heated temperature sensor 322 is under continuous constant excitation in accordance with various embodiments of multiphase flow metering.

Figure 13:
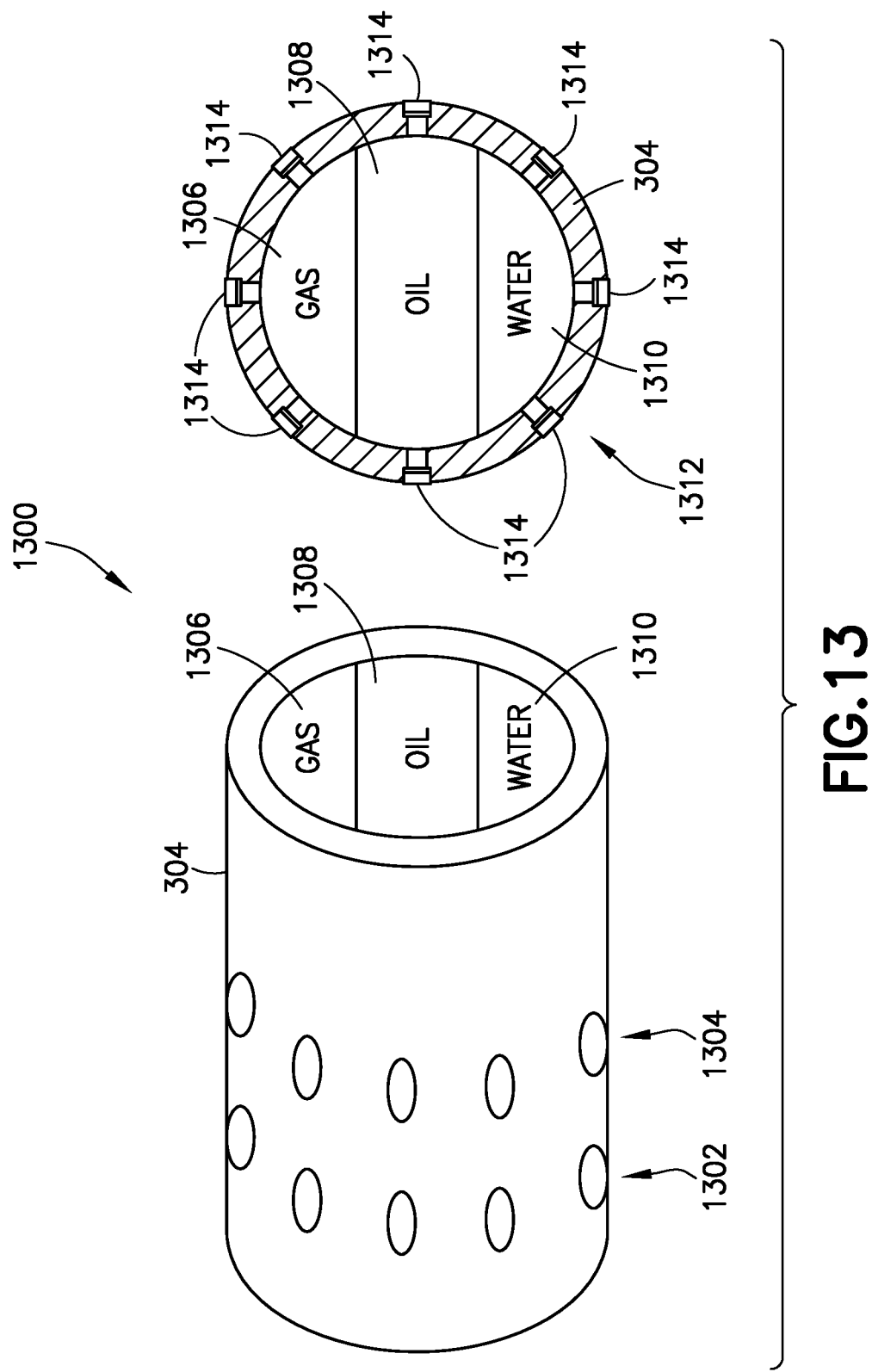
FIG. 13 illustrates an example multiphase flow measurement system in accordance with embodiments of multiphase flow metering.

FIG. 13 illustrates an example multiphase flow measurement system 1300 in accordance with various embodiments of multiphase flow metering. In one possible implementation, multiphase flow measurement system 1300 can be used with stratified flows. Multiphase flow measurement system 1300 can also serve as an example of temperature sensor distribution for cross section flow mapping.

In one possible embodiment, multiphase flow measurement system 1300 can include two or more sets 1302, 1304 of sensors distributed along adjacent cross sections of production tubing 304. Multiphase flow measurement system 1300 can be positioned at a location in production tubing 304 at which the multiphase flow flowing through has had an opportunity to slow down such that phases in the multiphase flow, such as gas 1306, oil 1308, and water 1310, have settled out. Any elements known in the art that can effect such a slowdown of the multiphase flow in production tubing 304 can be employed, including, for example, one or more chokes or other types of valves (such as, for example, chamber valves), various sized tubing that increases tubing diameter along the flow path, etc., as well as any combination thereof.

In one possible implementation, multiphase flow measurement system 1300 can be located downstream of Venturi nozzle 302 (not shown in FIG. 13). First set 1302 of sensors can be operated in passive mode and can serve to measure reference temperatures in various locations around a cross section of production tubing 304. In one possible aspect, first set 1302 of sensors can include any types of temperature sensors known in the art suitable for use in a production tubing environment, such as, for example, reference temperature sensors 320, passive temperature sensor(s) 800, and any possible combination thereof.

Second set 1304 of sensors can be excited by pulse power or constant power as in the techniques described above. In one possible aspect, second set 1304 of sensors can include any types of temperature sensors known in the art that can both excite and measure a temperature of the flow proximate thereto, such as, for example, heated temperature sensor(s) 322. In one possible implementation, when first set 1302 of sensors and second set 1304 of sensors are present, multiphase flow measurement system 1300 may be operated with one or more differential pressure measurement sensors (such as differential pressure measurement sensors 310) in manners similar to those discussed above in conjunction with multiphase flow measurement systems 300, 300(2) illustrated in FIGS. 3 and 5.

In addition to first set 1302 of sensors and second set 1304 of sensors, any number of additional sets of sensors can be added downstream of second set 1304 of sensors, with such additional sets of sensors being in passive and/or active mode. For example, an extra set of sensors, such as passive temperature sensor(s) 800, can be located downstream of second set 1304 of sensors, enabling multiphase flow measurement system 1300 to be operated in manners similar to those discussed above in conjunction with multiphase flow measurement system 300(4) illustrated in FIG. 8. In such a configuration, differential pressure measurement sensors, such as differential pressure measurement sensors 310, can be disregarded. Alternately, or additionally, one or more differential pressure measurement sensors can be present and used for verification purposes.

Sensors 1314 are illustrated in cross section view 1312 of production tubing 304. When cross section 1312 is taken at a location corresponding to first set 1302 of sensors, sensors 1314 can represent sensors operated in passive mode such as reference temperature sensors 320, passive temperature sensor(s) 800, and any possible combination thereof. Similarly, when cross section 1312 is taken at a location corresponding to second set 1304 of sensors, sensors 1314 can represent sensors which can be excited by pulse power or constant power, such as heated temperature sensor(s) 322.

In one possible implementation, when the three phases (such as gas 1306, oil 1308, and water 1310) in a multiphase flow are mixed well into a spatially homogeneous mixture, and an excitation technique (such as any of those described above, including, for example, use of heated temperature sensor(s) 322) is applied, the Venturi nozzle 302 and sensors (such as reference temperature sensors 320, passive temperature sensor(s) 800, heated temperature sensor(s) 322, etc.) located in the same axis will measure the same characteristics, namely $U_m$, $\phi_w$, and $\phi_g$.

Stated another way for the sake of clarity, and not limitation, when the phases (such as gas 1306, oil 1308, and water 1310) in the multiphase flow are well mixed, the multiphase flow is spatially homogeneous. Thus, measurements obtained by Venturi nozzle 302 and each pair of adjacent sensors (such as sensors 320, 322)—and/or Venturi nozzle 302 and triplet of adjacent sensors (such as sensors 320, 322, 800)—can be used to provide a value of flow velocity as well as water and gas fractions in the multiphase flow. In one possible implementation, due to the homogeneity of the mixture in the cross sections of production tubing 304, these flow velocities, water fractions, and gas fractions can be the same regardless of the location of the temperature sensors around the circumference of production tubing 304.

However, in some instances the mixing of the phases (such as gas 1306, oil 1308, and water 1310) in the multiphase flow can be poor, resulting in conditions such as stratification, slugging, etc. Poor mixing of the phases can occur, for example, due to low velocity of the multiphase flow. When poor mixing is present, phase stratification can occur, and the values of flow velocity of the multiphase flow along with thermal properties associated with the multiphase flow obtained from each group of adjacent sensors (i.e. pairs and/or triplets of sensors) may not be the same because some groups of adjacent sensors may be wetted by oil, other groups of adjacent sensors may be wetted by water, and still other groups of adjacent sensors may be wetted by gas.

In one possible implementation, based on the flow excitation techniques disclosed herein, each group of adjacent sensors can have its own value of oil, water and gas fractions. Since measurements with each group can be viewed as being done simultaneously, at each instant a tomography image of oil, water and gas fraction in the cross section of the heated sensors can exist as illustrated in FIG. 13.

In such a scenario, sensors wetted with water can provide $U_w$, $k_w$, and $\alpha_w$, those wetted with oil will give $U_o$, $k_o$ and $\alpha_o$, and those wetted with gas will measure $U_g$, $k_g$ and $\alpha_g$. Such differential pressure and temperature signals can provide real time mapping images of the cross section of production tubing 304, such as a tomography of velocity and thermal properties. It will be noted that in some instances the various stratified phases (gas 1306, oil 1308, and water 1310) flowing in production tubing 304 can be flowing at different velocities.

Averaging over the space occupied by each phase (gas 1306, oil 1308, and water 1310) can provide a phase fraction $\phi_w$, $\phi_O$ and $\phi_g$. The individual flow rates and the total flow rate can then be computed as:

$$Q_w = A\phi_w U_w, \ Q_o = A\phi_o U_o, \ Q_g = A\phi_g U_g, \text{ and } Q_t = Q_w + Q_o + Q_g \quad (15)$$

In another possible embodiment, a flow regime (such as a mixing level of the various phases in a multiphase flow) in production tubing 304 can be adjusted for improved and/or optimized measurement characteristics by, for example, artificially creating stratified flow, artificially creating annular flow slugging and/or creating other regimes. Such a technique of altering flow regimes can be used in conjunction with multiphase flow measurement system 1300, as well as any of the multiphase flow measurement systems 300, 300(2), 300(4).

For example, in one possible aspect, a control valve can be installed downstream of the temperature sensors 320, 322, 800 and be opened and closed according to, for example, an operator's decision (including decisions which are automated) using electrical and/or hydraulic excitation. Such a valve can be used to control not just the flow regime, (such as to create a stratified multiphase flow as illustrated in FIG. 13 or mixed multiphase flows as discussed in conjunction with FIGS. 3-12), but such a valve can also be used to control a relative hold-up of each phase by controlling a variation of a choke as a spatial function across production tubing 304. This can, for example, be used to induce controlled changes in the phase proportions of the flow in production tubing 304 and move a position of the various interfaces between the phases (gas 1306, oil 1308, and water 1310) across the locations of the fixed sensors 320, 322, 800. Applications of this technique, combined with previous embodiments described herein, can allow an operator to control the relative flow speed and proportion of each phase (gas 1306, oil 1308, and water 1310) to be calculated, allowing for an estimation of, for example, phase-slip. Knowledge of the control movement, and sensor response functions can then be used to enhance the estimate of phase fraction in the multiphase flow. For example, a prior knowledge of a correlation between a location of a liquid interface and the movement of the control valve described above can be used to enhance an estimation of phase fraction in the multiphase flow.

In another possible implementation, adaptive sensor excitation can be pursued. For example, by noting that flow regimes can be very dynamic, in particular slug flows, a combination of both continuous and pulsed power techniques can be employed in conjunction with heated temperature sensor(s) 322.

For instance, in some cases slug flows can be quite periodic in nature, which can be determined by incoming phase fractions of phases (gas 1306, oil 1308, and water 1310), and the geometry of a flow system (which can include any attached wellbore in a hydrocarbon production system).

In one possible aspect, in a multiphase slugging flow, the application of pulsed power techniques in conjunction with heated temperature sensor(s) 322 can lead to difficulties in discriminating the difference between oil and water in the liquid phase, due to the dynamic flow inducing large fluctuations and limiting the amount of averaging possible for accurate discrimination. However, this can be overcome by the addition of a small level of continuous power to heated temperature sensor(s) 322. By deconvolving this power from the applied power pulses, the power acts as a "watchdog" ensuring that the sensing system (comprising sensors such as reference temperature sensors 320, heated temperature sensor(s) 322 and potentially also passive temperature sensor(s) 800, as illustrated in multiphase flow measurement system 1300, and multiphase flow measurement systems 300, 300(2), 300(4)) is active at all times and allows high frequency and continuous measurement of changes in fluid diffusivity, while limiting power consumption to desired levels.

In one possible aspect, analytical techniques based on measurements made by sensors 320, 322, 800 under such a continuous power regime can be used to discriminate the periodicity within the slug flow structure. Such analytical techniques can also be used to provide an adaptive algorithm designed to excite the temperature sensors 320, 322, 800 according to the mixture flow regime (i.e. stratified flow, mixed flow, slugging flow, etc.) and the expectation of a given fluid within production tubing 304. In such a manner, correlation between measurements from sensors 320, 322, 800 and the presence of a particular fluid can be achieved, resulting in an enhanced signal to noise ratio, and effective fluid property measurement in complex flow regimes including, for example, the measurement of water fraction within a gas/liquid (i.e. water and oil) slug flow regime. This can be continuously adapted to match the flow regimes being experienced as the flow comes from formation 142, or to match one or more artificial flow regimes being modulated by use of a control valve downstream of temperature sensors 320, 322, 800 which can be opened and closed according to, for example, an operator's decision (including decisions which are automated) using electrical and/or hydraulic excitation.

Example Methods

Figure 14:
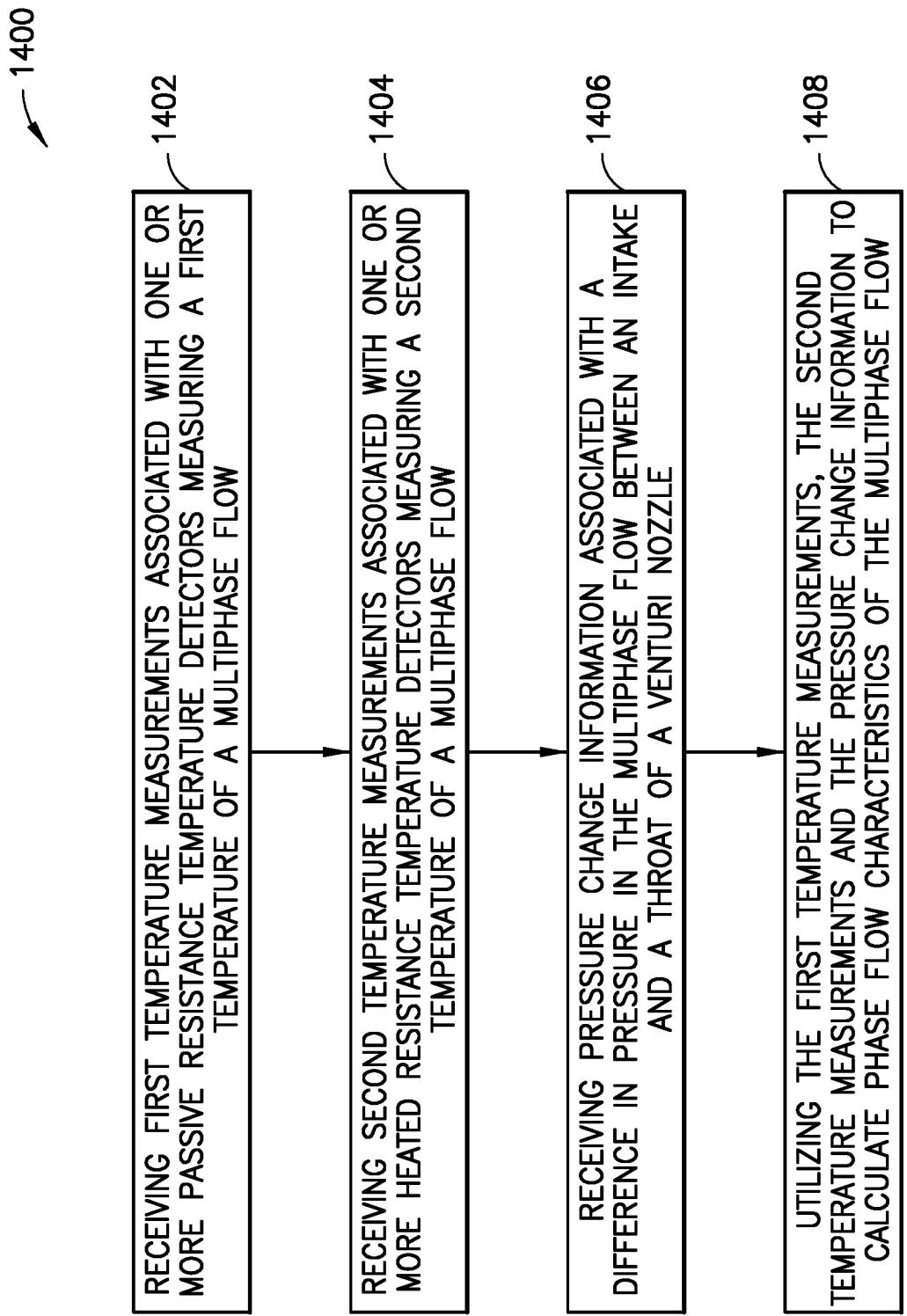
FIG. 14 illustrates example method(s) associated with embodiments of multiphase flow metering.

FIG. 14 illustrates example methods for implementing aspects of multiphase flow metering. The methods are illustrated as a collection of blocks and other elements in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks and/or elements may be deleted from the methods without departing from the spirit and scope of the subject matter described therein. In the context of software, the blocks and other elements can represent computer instructions that, when executed by one or more processors, perform the recited operations. Moreover, for discussion purposes, and not purposes of limitation, selected aspects of the methods may be described with reference to elements shown in FIGS. 1-13. Moreover, in some possible implementation, all or portions of the methods may, at least partially, be conducted using, for example, computing device 200.

FIG. 14 illustrates an example method 1400 associated with embodiments of multiphase flow metering. At block 1402, one or more first temperature measurements associated with one or more passive resistance temperature detectors (such as for example, reference temperature sensor(s) 320 and/or passive temperature sensor(s) 800) measuring a first temperature of a multiphase flow are received. In one possible implementation, the one or more first temperature measurements can be received by a data acquisition system, such as a data acquisition system 324.

At block 1404, one or more second temperature measurements associated with one or more heated resistance temperature detectors, such as for example, heated temperature sensor(s) 322, measuring a second temperature of the multiphase flow are received. In one possible implementation, the one or more second temperature measurements can be received by a data acquisition system, such as a data acquisition system 324.

At block 1406, pressure change information associated with a difference in pressure in the multiphase flow between an intake and a throat of a Venturi nozzle is received. In one possible aspect, the pressure change information is measured by a differential pressure measurement sensor, such as differential pressure measurement sensor 310. In one possible implementation, the pressure change information can be received by a data acquisition system, such as a data acquisition system 324.

At block 1408, the first temperature measurements, the second temperature measurements, and the pressure change information are used to calculate phase flow characteristics of the multiphase flow. In one possible implementation, at least part of these calculations can be conducted at a data acquisition system, such as a data acquisition system 324. Phase flow characteristics of the multiphase flow can include, for example, the presence of gas in the multiphase flow, the total flow rate of the multiphase flow, the individual phase volume fractions within the multiphase flow, etc.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. Moreover, embodiments may be performed in the absence of any component not explicitly described herein.

In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A multiphase flow measurement system comprising:
   a Venturi nozzle for accepting and mixing a multiphase flow upstream located in a production tubing;
   a differential pressure measurement sensor configured to measure a change of pressure of the multiphase flow from an inlet of the Venturi nozzle to a throat of the Venturi nozzle;
   at least one reference temperature sensor located along the production tubing at a first position that is downstream of the Venturi nozzle and configured to measure a first temperature of the multiphase flow;
   at least one heated temperature sensor located along the production tubing at a second position that is downstream of the reference temperature sensor, the at least one heated temperature sensor configured to excite the multiphase flow and measure a second temperature of the multiphase flow, wherein a cross-sectional shape along a length of the production tubing from the first position to the second position is substantially the same; and
   a control system configured to receive the measured first temperature of the multiphase flow, the measured second temperature of the multiphase flow, and the change of pressure of the multiphase flow from the inlet of the Venturi nozzle to a throat of the Venturi nozzle, and to calculate phase flow characteristics of the multiphase flow based on the measured first temperature of the multiphase flow, the measured second temperature of the multiphase flow, and the change of pressure of the multiphase flow, wherein the phase flow characteristics comprise the presence of gas in the multiphase flow, the total flow rate of the multiphase flow, and the individual phase volume fractions within the multiphase flow.

2. The multiphase flow measurement system of claim 1, further comprising: a water cut sensor located between an outlet of the Venturi nozzle and the at least one reference temperature sensor.

3. The multiphase flow measurement system of claim 2, wherein the water cut sensor makes measurements based on one or more of: resistivity and capacitance.

4. The multiphase flow measurement system of claim 1, further comprising:
  a data acquisition system configured to accept data from the at least one reference temperature sensor and the at least one heated temperature sensor and use the data to calculate one or more phase flow characteristics of the multiphase flow.

5. The multiphase flow measurement system of claim 1, further comprising:
  at least one passive temperature sensor located at a third position along the production tubing downstream of the heated temperature sensor configured to measure a third temperature of the multiphase flow, wherein a cross-sectional shape along a length of the production tubing from the first position to the third position is substantially the same.

6. The multiphase flow measurement system of claim 1, further comprising:
  a control valve located along the production tubing downstream of the at least one heated temperature sensor, the control valve being configured to allow a user to create a stratified flow of the multiphase flow.

7. The multiphase flow measurement system of claim 6, wherein:
  the at least one reference temperature sensor comprises a plurality of reference temperature sensors placed at various locations about a circumference of the production tubing at the first position in which the multiphase flow is flowing; and
  the at least one heated temperature sensor comprises a plurality of heated temperature sensors placed at various locations about the circumference of the production tubing at the second position downstream of the plurality of reference temperature sensors.

8. The multiphase flow measurement system of claim 1, wherein the at least one reference temperature sensor comprises a passive resistance temperature detector; and further wherein the at least one heated temperature sensor comprises a heated resistance temperature detector.

9. The multiphase flow measurement system of claim 1, wherein the at least one heated temperature sensor is configured to excite the multiphase flow using one or more of: pulse power and constant power.

10. A multiphase flow measurement system comprising:
  production tubing through which a multiphase flow can be directed, the tubing including an intake end for accepting the multiphase flow;
  a Venturi nozzle for accepting the multiphase flow, the Venturi nozzle being between the intake end and a first position in the production tubing;
  a pressure change sensor configured to measure a difference in pressure in the multiphase flow between an intake of the Venturi nozzle and a throat of the Venturi nozzle;
  one or more reference temperature sensors located along the production tubing at the first position downstream of the intake end, the one or more reference temperature sensors being configured to measure a first temperature of the multiphase flow;
  one or more heated temperature sensors located along the production tubing at a second position that is downstream of the first position, the one or more heated temperature sensors being configured to heat up the multiphase flow and measure a second temperature of the multiphase flow, wherein a cross-sectional shape along a length of the production tubing from the first position to the second position is substantially the same; and
  a control system configured to receive the measured first temperature of the multiphase flow, the measured second temperature of the multiphase flow, and the change of pressure of the multiphase flow from the inlet of the Venturi nozzle to a throat of the Venturi nozzle, and to calculate phase flow characteristics of the multiphase flow based on the measured first temperature of the multiphase flow, the measured second temperature of the multiphase flow, and the change of pressure of the multiphase flow, wherein the phase flow characteristics comprise the presence of gas in the multiphase flow, the total flow rate of the multiphase flow, and the individual phase volume fractions within the multiphase flow.

11. The multiphase flow measurement system of claim 10, wherein at least one of the one or more reference temperature sensors and the one or more heated temperature sensors is configured to protrude from an inner wall of the production tubing into the multiphase flow.

12. The multiphase flow measurement system of claim 10, wherein the one or more reference temperature sensors comprise passive resistance temperature detectors; and further wherein the one or more heated temperature sensors comprise heated resistance temperature detectors.

13. The multiphase flow measurement system of claim 10, further comprising:
  a water cut sensor located between an outlet of the Venturi nozzle and the at least one reference temperature sensor.

14. The multiphase flow measurement system of claim 13, further comprising:
  one or more passive temperature sensors located along the production tubing at a third position that is downstream of the second position, the one or more passive temperature sensors at the third position in the tubing being configured to measure a third temperature of the multiphase flow.

15. The multiphase flow measurement system of claim 10, further comprising:
  a control valve configured to allow a user to perform actions comprising:
    opening the tubing;
    closing the tubing; and
    choking the multiphase flow in the tubing.

16. The multiphase flow measurement system of claim 15, wherein:
  the one or more reference temperature sensors are placed at various locations about a circumference of the production tubing at the first position; and
  the one or more heated temperature sensors are placed at various locations about the circumference of the production tubing at the second position.

17. A computer-readable tangible medium with instructions stored thereon that, when executed, direct a processor to perform acts comprising:
  receiving first temperature measurements associated with one or more passive resistance temperature detectors measuring a first temperature of a multiphase flow, the one or more passive resistance temperature detectors located along a production tubing at a first position;
  receiving second temperature measurements associated with one or more heated resistance temperature detectors measuring a second temperature of the multiphase flow, the one or more heated resistance temperature detectors located along the production tubing at a second position, wherein a cross-sectional shape along a length of the production tubing from the first position to the second position is substantially the same;

receiving pressure change information associated with a difference in pressure in the multiphase flow between an intake and a throat of a Venturi nozzle; and utilizing the first temperature measurements, the second temperature measurements, and the pressure change information to calculate one or more phase flow characteristics of the multiphase flow, wherein the phase flow characteristics comprise the presence of gas in the multiphase flow, the total flow rate of the multiphase flow, and the individual phase volume fractions within the multiphase flow.

18. The computer-readable tangible medium of claim 17, wherein the computer-readable tangible medium further includes instructions to direct the processor to perform acts comprising:

receiving water cut information associated with the multiphase flow; and using the water cut information along with the first temperature measurements, the second temperature measurements, and the pressure change information to calculate the one or more phase flow characteristics of the multiphase flow.

* * * * *